Jan. 3, 1939.   M. SHARKEY   2,142,379
TRUCK TIPPER AND WHEEL LOCK
Filed Feb. 24, 1938
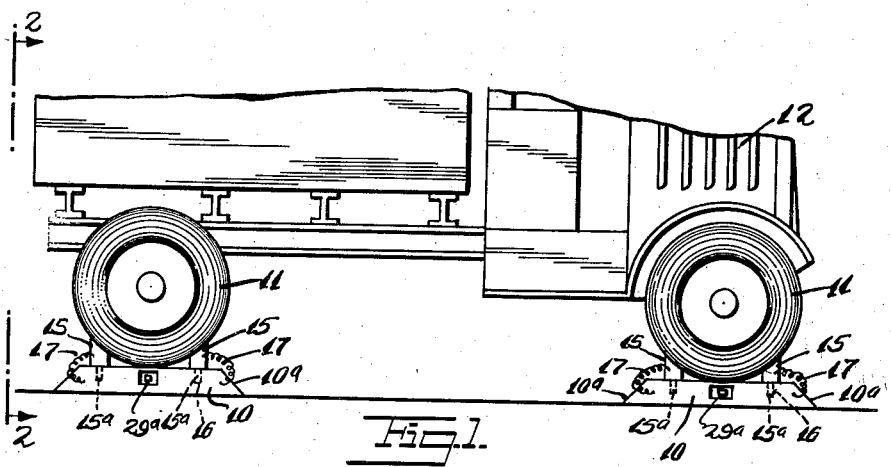
INVENTOR
*Michael Sharkey*
BY
ATTORNEY Patented Jan. 3, 1939

2,142,379

UNITED STATES PATENT OFFICE 2,142,379

TRUCK TIPPER AND WHEEL LOCK

Michael Sharkey, Brooklyn, N. Y.

Application February 24, 1938, Serial No. 192,317

2 Claims. (Cl. 254—126)

This invention relates to new and useful improvements in a truck tipper and wheel lock.

More specifically the invention refers to a construction characterized by a block upon which the wheel of a truck is adapted to rest for tilting the truck to one side, and associated means for locking the wheel thereon to prevent it from rolling off the block.

An object of the invention is to arrange the parts so that the block may be constructed in miniature so that it may be used in conjunction with a toy truck.

Still further the invention proposes the construction of a movably mounted arm which is adapted to engage the axle of the truck and a novel operating mechanism therefor for further lifting the same in the event that the block does not sufficiently tilt the truck.

Furthermore the use of wedges is proposed which may be engaged behind the wheel of the truck after it has been placed on the block for preventing the wheel from rolling therefrom.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a truck having the wheels at one side resting on blocks constructed according to this invention.

Fig. 2 is a view looking in the direction of the line 2—2 of Fig. 1.

Fig. 3 is a sectional view on the line 3—3 of Fig. 2.

Fig. 4 is a sectional view on the line 4—4 of Fig. 3.

Fig. 5 is a sectional view on the line 5—5 of Fig. 4.

The truck tipper and wheel lock, according to this invention, includes a hollow block 10 for resting on the ground and having an inclined end 10$^a$ upon which the wheel 11 of the vehicle 12 may ride. Members are removably mounted upon the block 10 for holding the wheel from accidentally rolling off of the block 10. An arm 13 is movably mounted in a plane axially of the wheel 11 on the block 10, and a fork 13$^a$ on the arm 13 is adapted to engage the axle 14 of the vehicle as the arm 13 moves upwards. A means is provided for raising and lowering the arm, and this means is mounted on the block 10, and has an operator on the outer side of the block by which the said means may be controlled.

The members for holding the wheel 11 in position upon the block 10 comprise wedge bodies 15 having stud portions 15$^a$ which are adapted to engage in complementary openings 16 formed in the upper face of the block 10. Chains 17 have one of their ends fixedly connected to the wedge bodies 15 and other of their ends connected to the block 10 for preventing the said wedge bodies from becoming lost, and to keep them in position so that they may be ready for use when needed.

The arm 13 is pivotally mounted upon a pin 18 which engages therethrough and has its ends engaging brackets 19 mounted on either side of the arm 13 and on the inner side of the block 10. The short end of the arm 13 engages through an opening 20 formed on the side of the block 10, and this short end is provided with a fork 13$^b$ which engages around a follower 21 threadedly engaging a vertical screw 22 which has its ends rotatively mounted in bearings 23 on the top and bottom walls of the hollow 10′ formed in the block 10. The bottom 10$^b$ of the block 10 is removably held in position by means of screws 24 so that the bottom 10$^b$ may be removed when the screws 24 are removed from the openings therein to permit access to the parts which are mounted within the hollow 10′.

The follower 21 has at its sides pins 25 which engage slots 26 formed in the forked end 13$^b$ of the arm 13 so that as the follower 21 moves up and down on the vertical screw 22 the arm 13 will pivot on the pin 18. The top end of the vertical screw 22 is provided with a bevel gear 27 which meshes with another bevel gear 28 mounted upon a shaft 29 having its ends rotatively supported in a bracket 30 and a portion of the side wall of the block 10. The outer end 29$^a$ of the shaft 29 is provided with a square head upon which a tool may be engaged for rotating the shaft 29, which in turn will rotate the screw 22 causing the follower 21 to move up and down, correspondingly raising or lowering the arm 13.

When the follower 21 moves downwards the outer end of the arm 13 which is provided with the fork 13$^a$ will move upwards to cause this fork to engage the axle 14, and if the lowering of the follower 21 continues the fork 13$^a$ will raise the truck to a position in which the wheels 11 will no longer engage the top face of the block 10. The fork 13$^a$ is provided with a roller 31 which is rotatively supported upon a shaft 32 having its ends engaging the side arms of the fork 13ᵃ. Thus when the fork 13ᵃ moves towards the axle 14, the roller 31 will contact and rotate to permit the fork to raise the vehicle 12.

The operation of the device is as follows:—

When it is desired to tilt the vehicle 12 towards one side to empty the contents of the truck body, the wedge bodies 15 are removed from the top faces of the blocks 10 and the wheels 11 are driven up the inclined sides 10ᵃ to a position in which they will rest upon the top faces of the blocks 10. The wedge bodies are then positioned upon the top faces of the blocks 10 to prevent the wheels 11 from accidentally rolling therefrom, and the operator proceeds to empty the truck. If he sees that the truck is not sufficiently tilted he may engage a turning tool upon the square end 29ᵃ of the shaft 29 of each block 10, and start turning the same in a direction so that the follower 21 will move downwards to pivot the forked portion 13ᵃ of the arm 13 so that it will engage the axle 14. When he continues turning the shaft 29 the arm 13 will pivot still further raising the wheel 11 off the block 10, tilting the truck to a further extent, and permitting the contents to be easily removed therefrom.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a truck tipper and wheel lock, a block for resting on the ground and having an inclined end up which a vehicle wheel may ride, members removably mounted on said block for holding said wheel from accidentally rolling off said block, a fork on said arm for engaging the axle of said wheel as the arm moves upwards, an arm movably mounted on said block, and means for raising and lowering said arm and mounted on said block and having an operator member on the outer side of the block by which said means is controlled, said arm being pivotally mounted on brackets formed on the inner side of said block, said means for raising and lowering said arm comprising a vertical screw rotatively supported within said block, a forked end formed on said arm and within said block, a follower on said vertical screw, pins extending from the sides of said follower and engaging slots in said forked end for pivoting said arm as said follower moves up and down, and means for rotating said vertical screw.

2. In a truck tipper and wheel lock, a block for resting on the ground and having an inclined end up which a vehicle wheel may ride, members removably mounted on said block for holding said wheel from accidentally rolling off said block, an arm movably mounted on said block, a fork on said arm for engaging the axle of said wheel as the arm moves upwards, and means for raising and lowering said arm and mounted on said block and having an operator member on the outer side of the block by which said means is controlled, said arm being pivotally mounted on brackets formed on the inner side of said block, said means for raising and lowering said arm comprising a vertical screw rotatively supported within said block, a forked end formed on said arm and within said block, a follower on said vertical screw, pins extending from the sides of said follower and engaging slots in said forked end for pivoting said arm as said follower moves up and down, and means for rotating said vertical screw, comprising a bevel gear fixedly mounted on the top end of said vertical screw, a shaft rotatively supported in said block and having one of its ends extending to the outside of said block, a bevel gear on said shaft meshing with said first-mentioned bevel gear, and a square head formed on the extended end of said shaft upon which a tool may be engaged for rotating the same.

MICHAEL SHARKEY.